(12) United States Patent
Bonnah, II

(10) Patent No.: US 12,727,557 B2
(45) Date of Patent: Sep. 8, 2026

(54) NUTRIENT FILM DEVICE AND NUTRIENT FILM TECHNIQUE HYDROPONIC SYSTEM

(71) Applicant: Flow-Rite Controls, Ltd., Byron Center, MI (US)

(72) Inventor: Harrie W. Bonnah, II, East Grand Rapids, MI (US)

(73) Assignee: Flow-Rite Controls, Ltd., Byron Center, MI (US)

( * ) Notice: Subject to any disclaimer, the term of this patent is extended or adjusted under 35 U.S.C. 154(b) by 0 days.

(21) Appl. No.: 18/944,508

(22) Filed: Nov. 12, 2024

(65) Prior Publication Data

US 2026/0130332 A1 May 14, 2026

(51) Int. Cl.

*A01G 31/02* (2006.01)
*A01G 27/00* (2006.01)
*A01G 31/00* (2018.01)

(52) U.S. Cl.

CPC ......... *A01G 31/025* (2025.01); *A01G 27/005* (2013.01); *A01G 31/008* (2025.01); *A01G 31/065* (2025.01)

(58) Field of Classification Search

CPC .... A01G 27/003; A01G 31/04; A01G 31/042; A01G 31/045; A01G 31/047; A01G 31/06; A01G 31/00; A01G 31/011; A01G 27/005; A01G 31/065; A01G 31/008; A01G 31/025

See application file for complete search history.

(56) References Cited

U.S. PATENT DOCUMENTS 8,250,809 B2 * 8/2012 Simmons .............. A01G 31/02 47/62
10,757,877 B2 * 9/2020 Fyvolent ............... A01G 31/06
11,206,774 B2 12/2021 Sperry et al.
11,672,215 B2 * 6/2023 Hersh .................. A01G 31/06
11,903,351 B2 2/2024 Sperry et al.
2014/0000162 A1 * 1/2014 Blank .................. A01G 31/06 47/62 A
2015/0223418 A1 * 8/2015 Collins ................ A01G 9/024 47/62 R
2022/0132762 A1 5/2022 Madeux
2024/0000029 A1 * 1/2024 Wantland .............. A01G 31/06
2024/0206410 A1 * 6/2024 Wilcox ................. A01G 31/02
2024/0349668 A1 * 10/2024 Holm ................... A01G 31/02

FOREIGN PATENT DOCUMENTS

CN 116584368 A * 8/2023 ............ A01G 31/02
JP 2017127199 A * 7/2017 ............ A01G 31/06
WO WO-2017185116 A1 * 11/2017 ............ A01G 31/06

* cited by examiner

*Primary Examiner* — Carly W. Lynch

(74) *Attorney, Agent, or Firm* — Warner Norcross + Judd LLP

(57) ABSTRACT

A nutrient film technique hydroponic system includes a growing tower, a nutrient film generator, and a nutrient reservoir configured to hold a supply of nutrient liquid. The nutrient film generator converts a flow of nutrient liquid from the reservoir into a nutrient film flowing along an inner surface of the growing tower. Methods for cultivating plants in a hydroponic system are provided.

19 Claims, 6 Drawing Sheets

22
140
136
146
138
134U
148
150
132
X
X

22
X
140
132
142
138
134U
132
L
136
144
X
134L

NUTRIENT FILM DEVICE AND NUTRIENT FILM TECHNIQUE HYDROPONIC SYSTEM

BACKGROUND

The present invention relates to hydroponics, and more particularly to hydroponic systems using nutrient film technique.

Hydroponics is the method of growing plants without soil, using a solution of water and dissolved mineral and/or organic nutrients, e.g., "nutrient water." Only the roots are immersed in the nutrient water, and sometimes only the tips of the roots are immersed. Because soil nutrients are not available to the plants, it is critical that all of the growing plants have access to the necessary nutrients in the nutrient solution. For productive growing, the nutrient concentration, oxygen concentration, pH, and temperature of the hydroponic nutrient solution must be within desired ranges.

Nutrient film technique (NFT) hydroponic systems are widely used and use a thin film of nutrient water flowing from one end to the other in the bottom of a trough-type tank. Typical NFT systems involves the flow of water down an inclined trough, with plant roots resting in oxygenated nutrient water or "nutrient film." This type of grow tank is widely used, for example, in commercial vegetable and herb operations. Many plants can grow side-by-side along the length of the trough. The plants sit in holes in the cover of the trough with the tips of their roots wetted by the film of flowing nutrient water. Oxygenated nutrient water is delivered to the inclined trough from a centralized reservoir using pumps. The nutrient water is delivered to the top of the trough and flows down through the trough as a nutrient film. In one type of recirculation system, the nutrient water from the trough is returned to the reservoir through a gravity return line at the bottom of the channel. These systems require the trough to be inclined so that the gravity can be used to form the nutrient film in the channel and for recirculation.

Most NFT systems are horizontal systems taking up wide swaths of facility floor space. One shortcoming of the horizontal nature of these trough-type systems is surface underutilization. Only the top surface of the trough (about 25%) is arable, e.g., suitable for planting. The remaining surfaces of the trough, including the sides and bottom of the trough, are unused.

To conserve floor space, some NFT systems use racking or shelving to stack conduits vertically. However, these systems still use the gravity-based, inclined-trough method of nutrient water delivery to the roots of the plants. In addition to surface underutilization, these stacked systems where multiple troughs are elevated relative to the centralized reservoir have a complex, three-dimensional network of pipes and joints, thereby adding installation expense and making modifications problematic.

Low pressure aeroponics (LPA) systems are a different solution that use a drip system to provide nutrient water to the plants. Typical LPA systems involves spraying droplets of nutrient water at low pressure inside a tower-like structure to splash upon the roots of plants growing in the tower. Sometimes these systems are incorrectly billed as vertical NFT systems even though they do not provide a film of nutrient water to the roots. Certain aspects of LPA systems are less than ideal, including uneven plant growth. Plants at the top of the tower-like structure tend to be underwatered and do not thrive.

There exists a need for a hydroponic system that can leverage the superior plant growth and other advantages of nutrient film technique while improving floor space utilization.

BRIEF SUMMARY

The present invention provides a nutrient film technique hydroponic system and a nutrient film generator which uses centrifugal force to form the nutrient film.

According to one aspect of the disclosure, a nutrient film technique hydroponic system for cultivating plants includes a growing tower having a sidewall at least partially defining a hollow interior, an inlet into the hollow interior an upper end of the growing tower, and a plurality of planting ports in the sidewall, wherein the plurality of planting ports are below the inlet and open to the hollow interior, a tower axis extending axially through the hollow interior, a pump configured to supply nutrient liquid to the inlet of the growing tower, and a nutrient film generator that converts a flow of nutrient liquid into a nutrient film flowing along an inner surface of the sidewall of the growing tower.

In this and other aspects of the disclosure, the nutrient film generator can include a swirler configured to induce a swirl on the nutrient liquid passing through the swirler to turn a flow direction of the nutrient liquid from being substantially axial to including a tangential component. Optionally, the swirler comprises a plurality of static vanes.

In this and other aspects of the disclosure, the nutrient film generator can include a casing having an inlet, wherein the inlet is centered on the tower axis swirler is at the inlet of the casing. Optionally, the casing has an upper wall curving to meet a sidewall to transition the flow direction of the nutrient liquid from including the tangential component to a helical swirling flow stream that flows along the inner surface of the sidewall of the growing tower.

In this and other aspects of the disclosure, the system includes an aerator fluidly upstream of the nutrient film generator, wherein the aerator is configured to inject air into the flow of nutrient liquid before the flow of nutrient liquid reaches the nutrient film generator. Optionally, the aerator is a venturi driven aspiration aerator that is in series with and directly upstream of the swirler.

In this and other aspects of the disclosure, the system includes a duty cycle timer interposed between a power source and the pump, wherein the duty cycle timer controls a duty cycle of the pump and thereby controls the flow of nutrient liquid to the growing tower.

According to another aspect of the disclosure, a nutrient film generator for a nutrient film technique hydroponic system can include a swirler comprising a plurality of vanes, an axis extending axially through the swirler and a casing having an inlet, wherein the inlet is centered on the axis, wherein the swirler is at the inlet of the casing and is configured to induce a swirl on nutrient liquid passing through the swirler to turn a flow direction of the nutrient liquid from being substantially axial to including a tangential component.

In this and other aspects of the disclosure, the casing comprises an upper wall curving to meet a substantially vertical sidewall to transition the flow direction of the nutrient liquid from including the tangential component to a helical swirling flow stream.

In this and other aspects of the disclosure, the casing includes a first diameter at the inlet that is less than a second diameter at the substantially vertical sidewall.

According to yet another aspect of the disclosure, a method for cultivating plants in a hydroponic system includes providing a growing tower having a sidewall at least partially defining a hollow interior, a tower axis extending axially through the hollow interior, an inlet into the hollow interior at an upper end of the growing tower, an outlet from the hollow interior at a lower end of the growing tower, and a plurality of planting ports in the sidewall, wherein the plurality of planting ports are below the inlet and open to the hollow interior, supplying nutrient liquid from a reservoir to the inlet of the growing tower, generating a nutrient film within the growing tower by inducing the nutrient liquid to flow axially and radially relative to the tower axis along an inner surface of the sidewall as a nutrient film, and collecting runoff nutrient liquid that exits from the outlet of the growing tower within the reservoir.

The present invention provides significant improvement in hydroponic system efficiency. These and other advantages and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION

Figure 1:
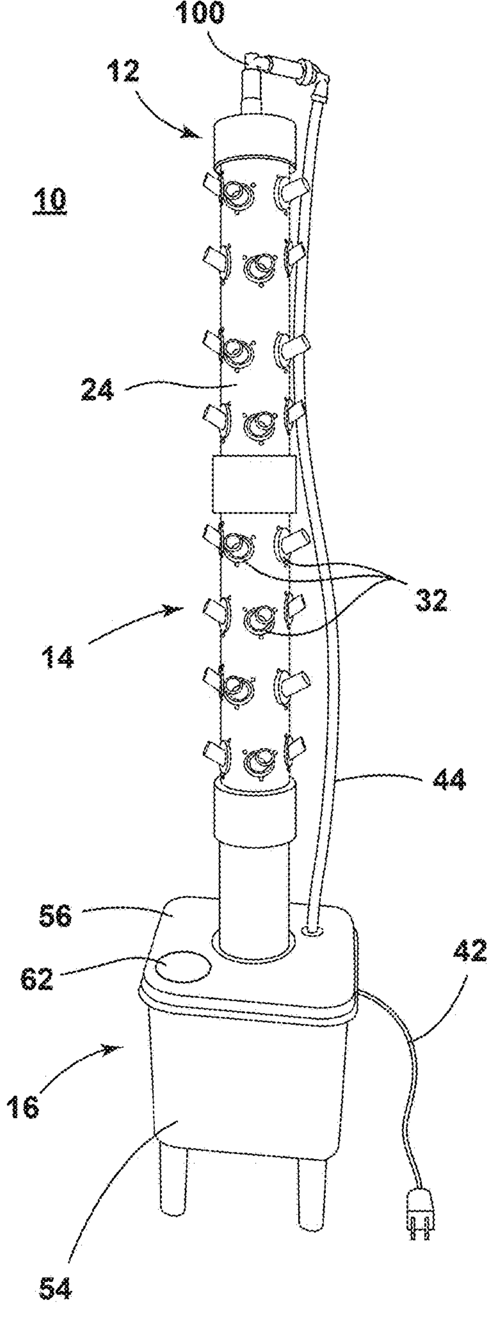
FIG. 1 is a perspective view of a nutrient film hydroponic system according to an aspect of the disclosure, showing a growing tower and a nutrient film generator.

Aspects of a nutrient film generator (NFG) and a nutrient film technique hydroponic system (NFT system) which use centrifugal force to form the nutrient film are shown and described herein.

Before the embodiments of the invention are explained, it is to be understood that the invention is not limited to the details of operation or to the details of construction; and the arrangement of the components set forth in the following description or illustrated in the drawings. The invention may be implemented in various other embodiments and may be practiced or carried out in alternative ways not expressly disclosed herein. Als, it is to be understood that the phraseology and terminology used herein are for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one or more of X, Y or Z individually, and any combination of any one or more of X, Y and Z, for example, X, Y, Z; X, Y; X, Z; and Y, Z.

As used herein, "nutrient film" or "thin film" refers to a thin stream of flowing nutrient solution, also referred to herein as nutrient liquid, containing all the dissolved nutrients required for plant growth, where the film has a film depth on the order of about 3.0 to 13 mm (about ⅛ to ½ inch).

Directional terms, such as "vertical," "horizontal," "top," "bottom," "upper," "lower," "above," "below,' "inner," "inwardly," "outer" and "outwardly," and derivatives thereof are used to assist in describing the invention based on the orientation of the embodiments shown in the illustrations. The use of directional terms should not be interpreted to limit the invention to any specific orientation(s).

Embodiments of a nutrient film technique hydroponic system (NFT system) and a nutrient film generator (NFG) are illustrated in the drawings and designated 10 and 12, respectively. The NFT system 10 may include at least one growing tower 14, at least one NFG 12 mounted to the growing tower 14, and a nutrient reservoir 16. The NFG 12 converts a flow of nutrient liquid into a nutrient film flowing along an inner surface of the growing tower 14.

Figure 2:
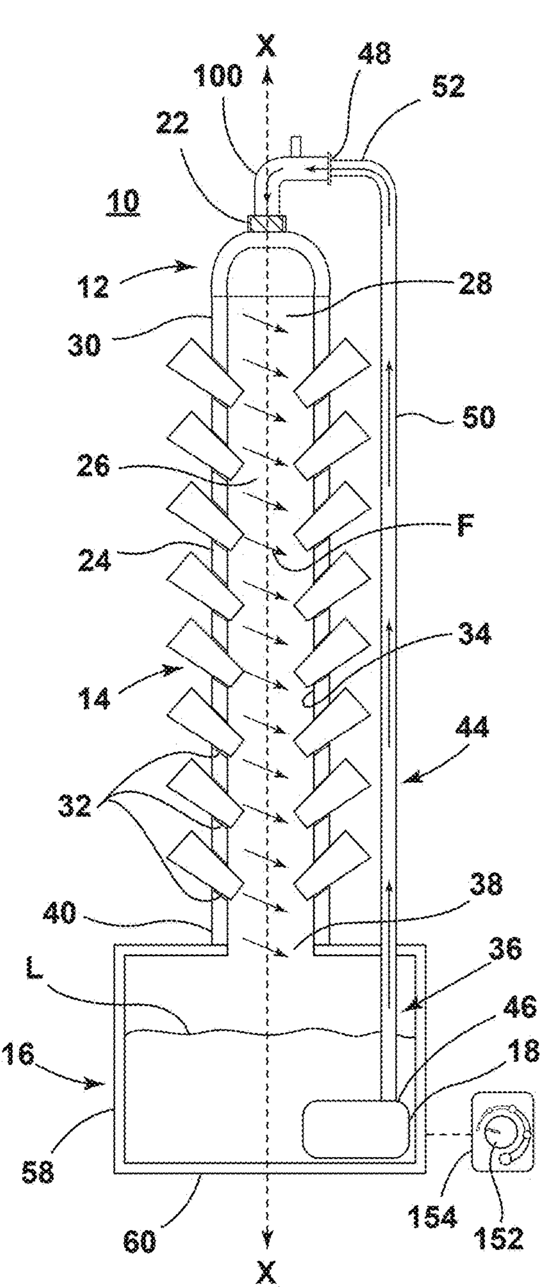
FIG. 2 is a schematic view of the nutrient film hydroponic system from FIG. 1.
Figure 3:
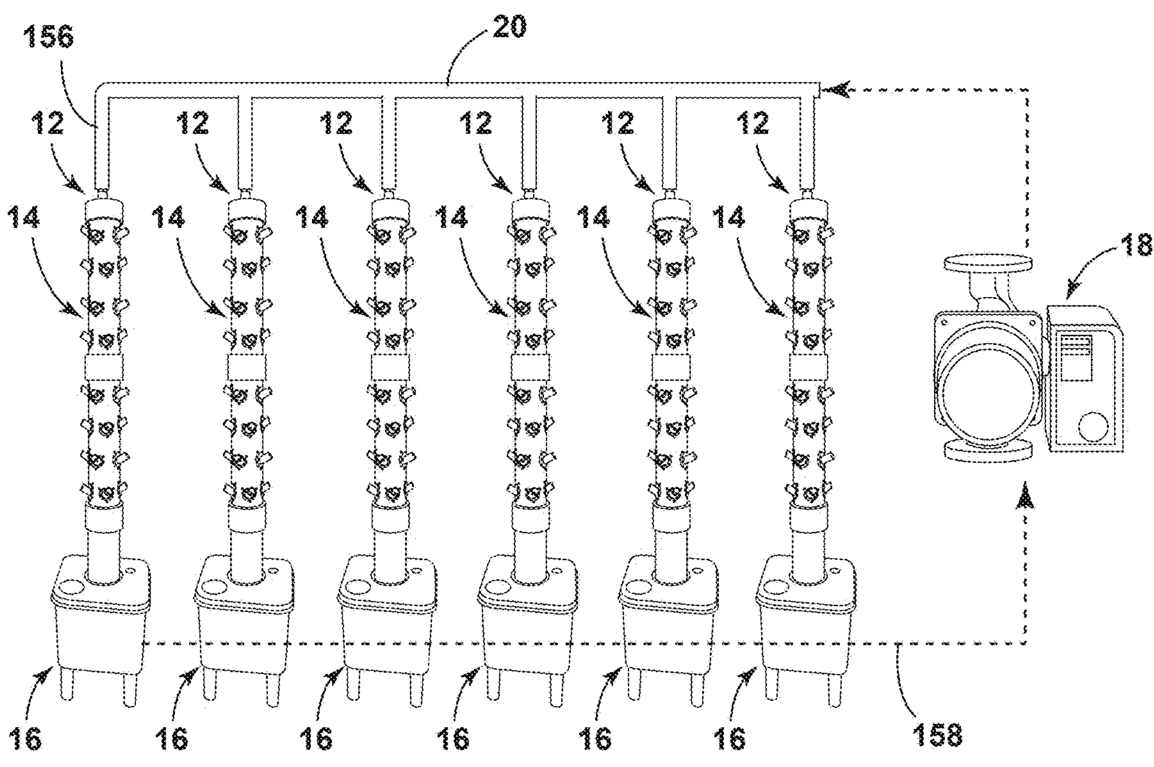
FIG. 3 is a perspective view of a nutrient film hydroponic system according to another aspect of the disclosure.

It is noted the NFT system 10 and the NFG 12 may be used in at least two types of hydroponic installations. A first installation type, an example of which is illustrated in FIGS. 1-2 includes one growing tower 14 arranged in proximity to the NFG 12 and the nutrient reservoir 16. In this type of installation, the NFG 12 is mounted to the growing tower 14 and the growing tower 14 drains into the nutrient reservoir 16. The nutrient reservoir 16 is coupled to the NFG 12 by a pump 18. A second installation type, an example of which is illustrated in FIG. 3, includes multiple growing towers 14, and the nutrient reservoir 16 is remote from the growing towers 14. In this type of system, one NFG 12 is located on each growing tower 14 and the NFGs 12 are coupled with a manifold 20 connected to the pump 18.

In FIG. 1, the NFT system 10 according to one aspect of the disclosure is shown and in FIG. 2, a schematic of the NFT system 10 of FIG. 1 is shown. The growing tower 14 includes a sidewall 24 at least partially defining a hollow interior 26 and an inlet 28 into the hollow interior 26 at an upper end 30 of the tower 14. A tower axis X extends axially through the hollow interior 26, and the tower axis X may, in some embodiments, comprise a vertical axis and/or may be orthogonal to a surface on which the NFT system 10 is supported. The pump 18 supplies nutrient liquid to the inlet 28 of the growing tower 14. A plurality of planting ports 32 are present in the sidewall 24 of the tower 14, and are disposed below the inlet 28 and are open to the hollow interior 26. The growing tower 14 can be constructed of materials that do not release strong emissions to the seeds, plant roots or water, such as PVC, high impact polystyrene, or another suitable thermoplastic.

The NFT system 10 uses centrifugal force to create a nutrient film within the growing tower 14, represented by arrows F in FIG. 2. The NFG 12 converts a flow of nutrient liquid into a nutrient film flowing along an inner surface 34 of the sidewall 24 of the growing tower 14. In one aspect, the NFG 12 creates centrifugal force using a swirler 22 configured to induce a swirl on the nutrient liquid passing through the swirler 22 to turn a flow direction of the nutrient liquid from being substantially axial to including a tangential component. In addition to forming a substrate for nutrient film, the growing tower 14 serves a supportive and protective function, as well as screening light from plant roots developing on the inside of the tower 14.

The reservoir 16 is configured to hold a supply of nutrient liquid L, and can be fluidly coupled to the NFG 12 by a flow path 36 including the pump 18. To recirculate the nutrient liquid, the growing tower 14 has an outlet 38 from the hollow interior 26 at a lower end 40 of the tower 14, and the outlet 38 can drain into the reservoir 16. In one embodiment, the growing tower 14 can be mounted on the reservoir 16 to drain directly into the reservoir 16 to collect surplus or runoff nutrient liquid running down from the tower 14. In another embodiment the growing tower 14 can be remote from the reservoir 16.

The pump 18 can be a recirculation pump in fluidic communication with the reservoir 16 to recirculate nutrient liquid from the outlet 38 back to the inlet 28 of the growing tower 14. In the present embodiment, the pump 18 may be positioned within the reservoir 16. Accordingly, a submersible pump is contemplated and included within the scope of the invention.

When the pump 18 is operating, nutrient liquid L within the reservoir 16 may be drawn into an inlet of the pump 18 and pumped out of an outlet of the pump 18. As mentioned above, the outlet 38 of the tower 14 may be positioned so as to drain into the reservoir 16. In another embodiment, the pump 18 can be mounted within or to the growing tower 14. In yet another embodiment, the pump 18 can be remote from the reservoir 16 and/or remote from the growing tower 14.

A power supply cord 42 may extend from the pump 18, for example through a cord opening in the reservoir 16, and connect to a power source to power the operation of the pump 18. Alternative power sources are also contemplated and included within the scope of the invention, including, but not limited to, battery power and solar power.

The flow path 36 can include a conduit 44 having an inlet end 46 fluidly coupled to the outlet of the pump 18 and an outlet end 48 in fluidic communication with to the inlet 28 of the growing tower 14. In one embodiment, the outlet end 48 is in fluidic communication with to the inlet 28 via the NFG 12. In another embodiment, the outlet end 48 is in fluidic communication with to the inlet 28 via an aerator 100 or another component making up the flow path 36. The conduit 44 can have at least one conduit section 50 extending generally parallel to the tower axis X. The conduit may have at least one other conduit section 52 extending generally perpendicular to the tower axis X.

While not shown, the NFT system 10 can include other components to . . . . For example, the system 10 can include other conduits, ducts, tubing, hoses, connectors, valves, etc. fluidly coupling the components of the system 10 together and providing the flow path 36. As another example, a heating element can be provided for managing the temperature of the nutrient liquid. As yet another example, one or more sensors can be provided for detecting ambient conditions and other parameters affecting optimal growth.

The reservoir 16 can include an open-topped container 54 and a lid 56 for the open-topped container 54, wherein the lid 56 comprises a tower base engaging with the lower end 40 of the growing tower 14 and configured to support the growing tower 14 in a generally vertical orientation. The container 54 may be bounded by one or more sidewalls 58 and a lower wall 60 to define a fluid-tight volume within which the nutrient liquid L may be retained. The growing tower 14 may pass through an aperture in the lid 56 and the conduit 44 may pass through an aperture in the lid 56, and each aperture can include an air-tight seal so that the reservoir 16 can be pressurized by the pump 18.

The lid 56 may be configured to removably attach to the upper end of the container 54. The lid 56 can be removable from the container 54 to remove the growing tower 14 therefrom, and/or to service the pump 18 or flow path 36 of the system 10.

The lid 56 may comprise a fill opening 62 to facilitate filling the reservoir 16 with nutrient liquid without having to detach the lid 56 from the container 54 and/or without having to detach the tower 14 from the reservoir 16. The fill opening 62 may include a fill opening cover removably attachable to the lid 56, for example by a rotatable coupling, a threaded coupling, a press fit, a hinge, and the like.

As mentioned above, the tower 14 includes at least one sidewall 24. Any number of sidewalls 24 is contemplated and included within the scope of the invention. In the present embodiment the tower 14 has a cylindrical sidewall 24 defining a cylindrical shape of the tower 14. Other geometric shapes are contemplated and included within the scope of the invention, including, but not limited to, circles, ellipses, triangles, squares, rectangles, pentagons, hexagons, and the like. The inner surface 34 of the cylindrical sidewall 24 may be smooth to facilitate formation of the nutrient film.

The hollow interior 26 may extend through a vertical length of the tower 14 between the inlet 28 defined at the upper end 30 thereof and the outlet 38 defined at the lower end 40 thereof.

With a cylindrical, vertically-oriented growing tower 14, multiple sides of the tower 14 are arable, e.g., suitable for planting. The plurality of planting ports 32 can be spaced about the circumference of the cylindrical sidewall 24 and/or spaced vertically along the vertical length of the cylindrical sidewall 24 to maximize utilization of the sidewall 24. For example, one or more of the planting ports 32 can be diametrically-opposed to another one or more of the planting ports 32, such that opposing sides of the sidewall 24 are utilized for planting. Spacing planting ports 32 both circumferentially and axially relative to the tower axis X optimizes surface utilization conserve floor space. The dimensions of the tower 14, planting ports 32, and the spacing between the planting ports 32 can be selected based on the type of plant to be grown.

The NFT system 10 may include at least one grow pot 64 in one of the plurality of planting ports 32. In some embodiments the grow pots 64 may be integrally formed with the sidewall 24 as a single monolithic unit. In other embodiments the grow pots 64 may be formed separately and attached to the sidewall 24 by any means or method as is known in the art, including, but not limited to, a permanent, non-removable attachment and a removable attachment. It will be appreciated that the system 10 disclosed herein is not limited to include pots 64 and that the shape of the pot 64 in not limited to the shape shown. It will be appreciated that the pot 64 may be disposable or reusable.

Figure 4:
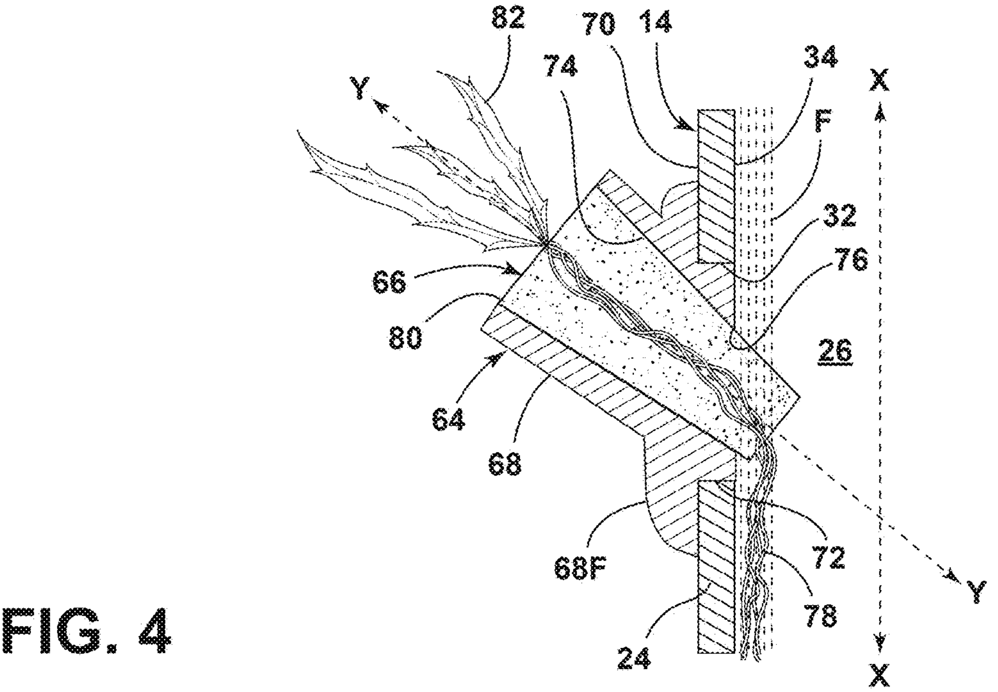
FIG. 4 sectional view through a portion of the nutrient film hydroponic system from FIG. 1 showing a grow pot mounted to the growing tower according to an aspect of the disclosure.

FIG. 4 is a sectional view through a grow pot 64 mounted to the tower 14 according to one aspect of the disclosure. The grow pot 64 is configured to be removably mounted in one of the planting ports 32 and is capable of receiving a plant grow media 66. The grow pot 64 can be constructed of a material that does not release strong emissions to the seeds, plant roots or water, such as PVC, high impact polystyrene, or another suitable thermoplastic.

The pot 64 can have an outer end 68 configured to extend outward from an outer surface 70 of the sidewall 24 and an inner or socket end 72 configured to be inserted into the planting port 32. The pot 64 may define a plant channel 74 configured to permit the plant grow media 66 to be positioned there within. The socket end 72 may further have an inner aperture 76 configured to permit the plant grow media 66 and/or plant roots 78 to pass therethrough and extend into the interior 26. The outer end 68 may further have an outer aperture 80 configured to permit the grow media 66 to be inserted into the pot 64 and extend into the plant channel 74, through the inner aperture 76, and into the interior 26. The channel 74 defines an axis Y extending through the outer aperture 80 and the inner aperture 76. The dimensions of the pot 64, including the dimensions of the channel 74, may be plant-dependent.

To minimize any negative effect on the flowing nutrient film F, the pot 64 may have minimal or no projection beyond the inner surface 34 of the sidewall 24. For example, in the embodiment of FIG. 4, the inner aperture 76 is flush with the inner surface 34 of the sidewall 24. The plant grow media 66 and/or plant roots 78 pass through the inner aperture 76 and into the interior 26 for exposure to the flowing nutrient film F.

The channel 74 may be configured to interface with a structure of the plant grow media 66 to prevent the entirety of the plant grow media 66 from passing through the inner aperture 76 and falling into the interior 26. For example, the channel 74 can taper, i.e., become narrower, along the axis Y thereof, and/or the axis Y of the channel 74 can be oblique to the tower axis X.

The outer end 68 of the pot 64 and/or the channel 74 can be inclined. For example, the axis Y of the channel 74 can be oblique to the tower axis X. Preferably, the pot 64 is inclined at an angle greater than 0 and less than 90 degrees to promote the upward growth and support of a plant 82 growing in the grow media 66. As noted above, this can aid in retaining the plant grow media 66 within the pot 64. Another advantage associated with the oblique axis Y is that, as the grow media 66 is moistened by capillary action, gravity can prevent liquid from leaking through from the outer aperture 80. The angle of the pot 64 may be plant-dependent, as some plants may thrive with a steeper angle while other plants may thrive with a shallower angle.

While show supporting a plant 82, it is understood that the plant grow media 66 can include a nutrient medium and/or a supplement that holds a seed or a plant. In one example, the grow media 66 can be provided as a plug, pod, or block that is inserted into the pot 64. Seeds can be planted in the grow media 66 for germination by the NFT system. Alternatively, a seedling or plant 82 can be transferred to the NFT system for further development.

The pot 64 may be configured to interface with the tower 14 to prevent the entirety of the pot 64 from passing through the planting ports 32 and falling into the interior 26. For example, the pot 64 may be attached to the tower 14 using fasteners, such as screws. The pot 64 can have a flange 68F that engages the exterior surface of the sidewall 24 and help maintain the orientation of the pot 64, with the fasteners (not shown) passing through the flange 68F. In another embodiment, the pot 64 can snap into the sidewall 24 of the tower 14. In yet another embodiment, the pot 64 can have a twist-lock with the sidewall 24 of the tower 14. Other attachment means or methods known in the art are possible, including a threaded coupling, a press fit, and the like.

Figure 5:
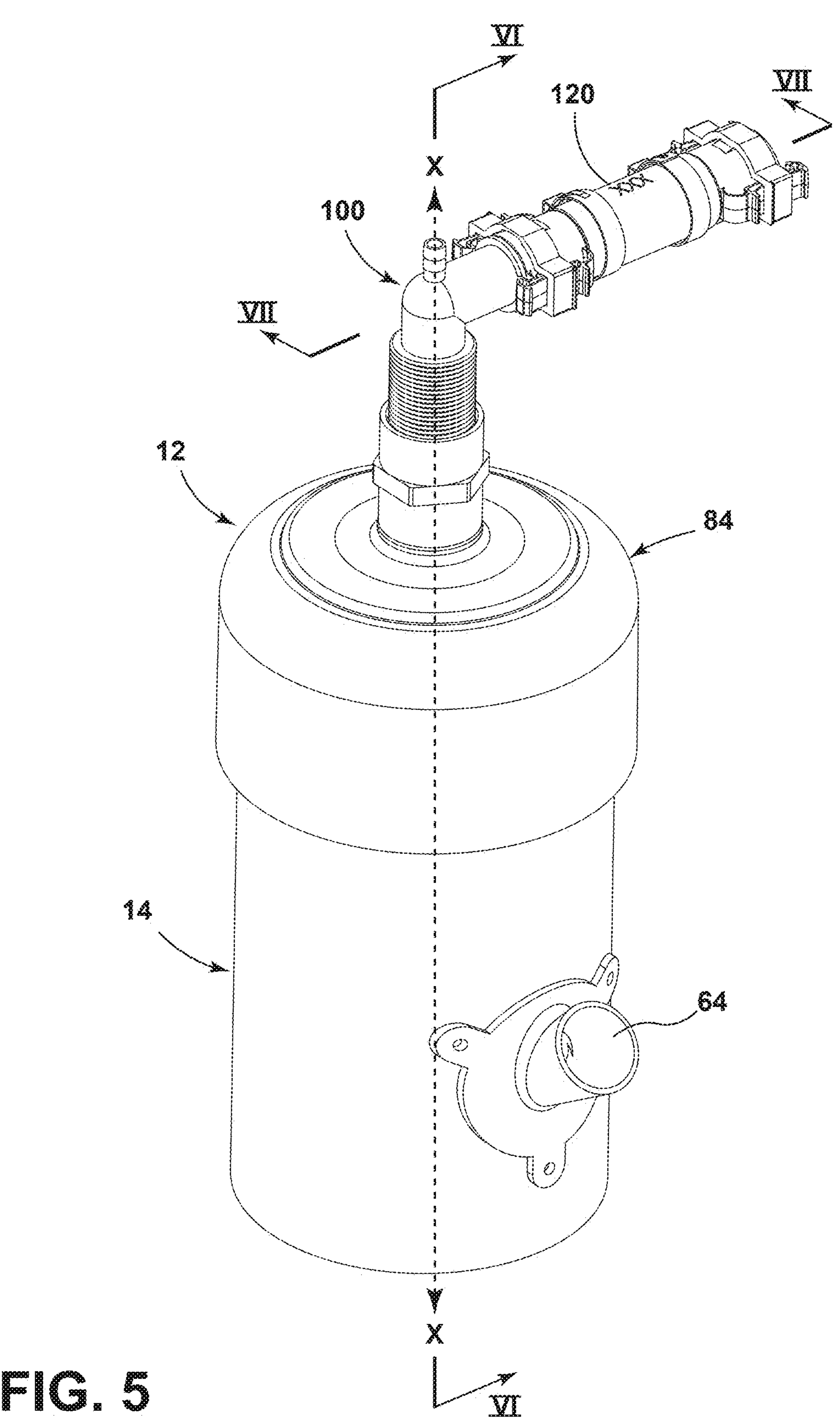
FIG. 5 is a perspective view of a portion of the nutrient film hydroponic system from FIG. 1, showing the nutrient film generator at an upper end of the growing tower.
Figure 6:
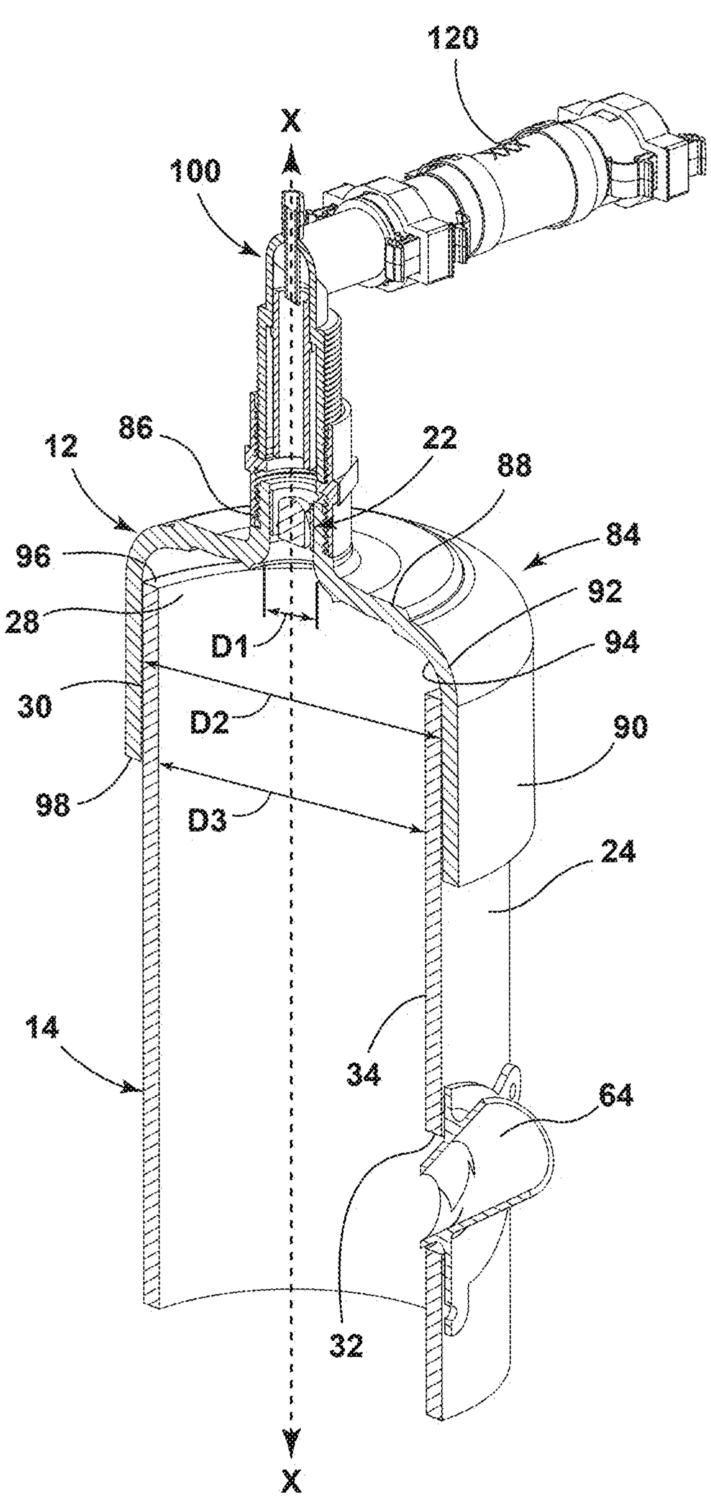
FIG. 6 is a cross-sectional view through line VI-VI of FIG. 5.

FIG. 5 is a perspective view showing the NFG 12 and the upper end 30 of the growing tower 14 and FIG. 6 is a cross-sectional view through line VI-VI of FIG. 5. The NFG 12 includes the swirler 22, which may be configured to impart a tangential, rotational, swirling, or spiral velocity vector to the nutrient liquid flowing through the NFG 12, and turn a flow direction of the nutrient liquid from being substantially axial, e.g., along axis X, to including a tangential component.

According to one aspect of the disclosure, the NFG 12 can include a casing 84 having an inlet 86, and the swirler 22 is at the inlet 86 of the casing 84. For example, the swirler 22 can in the inlet 86, just upstream of the inlet 86, or just downstream of the inlet 86. The inlet 86 and/or the swirler 22 can be aligned with the tower axis X, e.g., centered on the tower axis X. The inlet 86 can, in some embodiments, constitute the inlet of the NFG 12.

The casing 84 includes a rounded profile that curves from a substantially horizontal upper wall 88 to a substantially vertical sidewall 90 to transition the flow direction of the nutrient liquid from including the tangential component to a helical swirling flow stream that flows along the inner surface 34 of the sidewall 24 of the growing tower 14. The upper wall 88 can extend generally radially from the inlet 86 and joins the sidewall 90 at a corner 92 that is concave on the inner surface 94 of the casing 84.

The casing 84 can form a cap closing the inlet 28 at the upper end 30 of the tower 14. When the casing 84 is coupled with the tower 14, an upper edge 96 of the tower sidewall 24 can lie above a lower edge 98 of the casing 84 so that a portion of casing sidewall 90 runs along the outside of the tower sidewall 24 to securely seat the NFG 12 on the tower 14. In another embodiment, the casing sidewall 90 can be inserted within the tower sidewall 24. In yet another embodiment, the upper edge 96 of the tower sidewall 24 can abut the lower edge 98 of the casing 84. In still another embodiment, the casing 84 can be integrally formed with the growing tower 14, for example by blow-molding the growing tower 14 with a substantially closed upper end 30 closed by the casing 84, save for the inlet 86. In this embodiment, the tower sidewall 24 is continuous and/or integral with the casing sidewall 90.

The cross-sectional area of flow path through the NFG 12 and/or through the inlet 28 of the growing tower 14 can selectively control the liquid flow through the tower 14. For instance, the size of flow path through the NFG 12 and/or through the inlet 28 of the growing tower 14 can increase at least once in order to encourage the nutrient liquid to spread out over the inner surface 34 of the tower sidewall 24 and develop the helical swirling flow stream. In one embodiment, the casing 84 can have a first or inlet diameter D1 at the inlet 86, the inlet diameter D1 taken along a plane perpendicular to the tower axis X and passing through the inlet 86 and a second or casing diameter D2 at the sidewall 90, the casing diameter D2 taken along a plane perpendicular to the tower axis X and passing through the sidewall 90. The casing diameter D2 is greater than the inlet diameter D1. In at least some embodiments, the casing diameter D2 is the same as or substantially the same as the diameter of the casing 84 at the corner 92. The growing tower 14 can have a third or tower diameter D3 at the sidewall 24 (e.g., the inner diameter of the sidewall) taken along a plane perpendicular to the tower axis X and passing through the sidewall 24, where the tower diameter D3 is greater than the inlet diameter D1.

Figure 7:
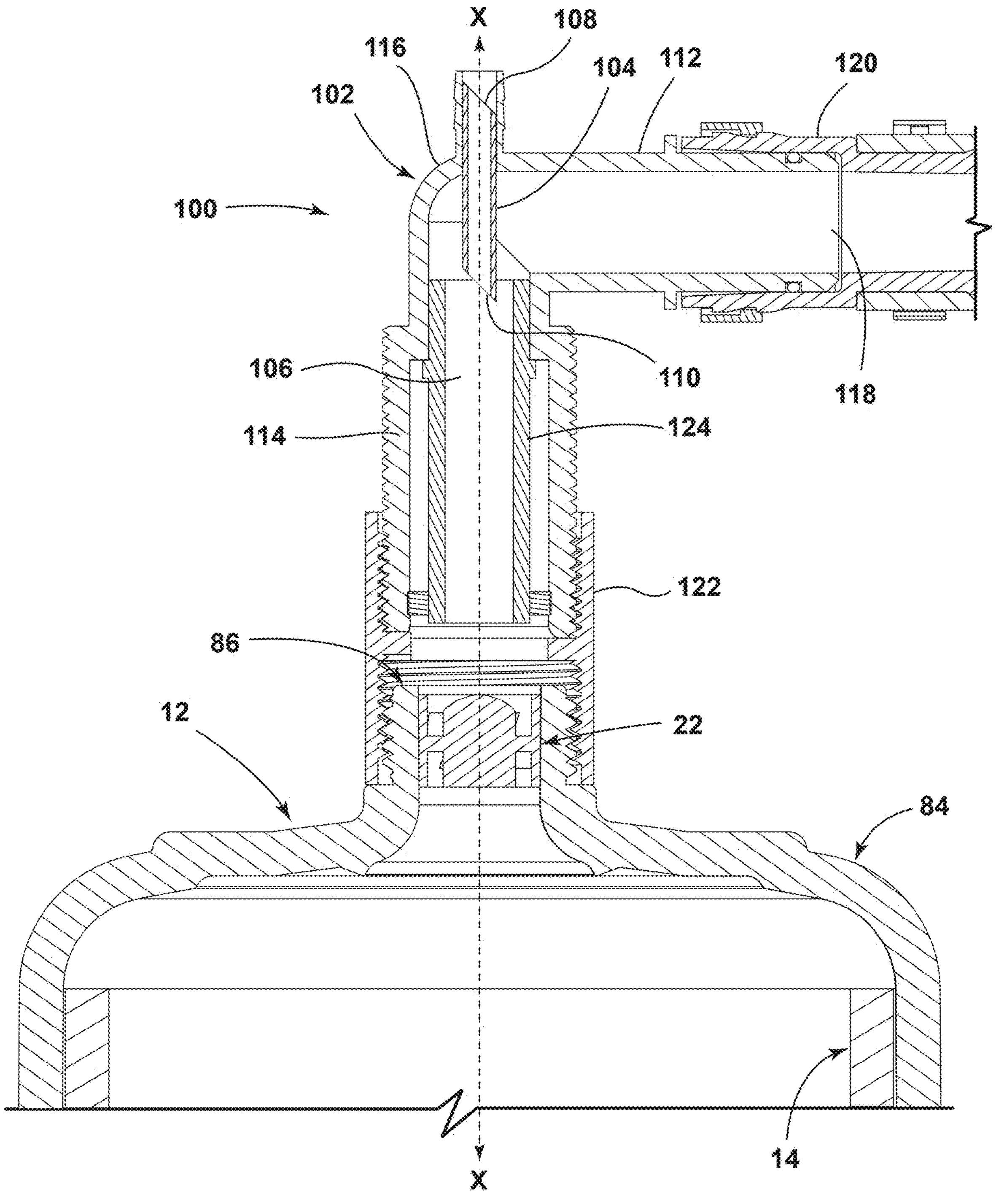
FIG. 7 is a cross-sectional view through line VII-VII of FIG. 5.

Referring to FIG. 7, according to one aspect of the disclosure, to provide aeration to the growing tower 14, the NFT system 10 can comprise an aerator 100 upstream of the swirler 22 to inject air into the flow of nutrient liquid before it reaches the swirler 22. In some configurations, the aerator 100 may be positioned in-line between the conduit 44 and the NFG 12 as illustrated in FIG. 1 to entrain air into the nutrient water. In one embodiment, the aerator 100 is "in series" with and directly upstream of the swirler 22 and is configured to eject fluid (e.g., an emulsion of nutrient liquid and air) axially along the tower axis X.

In one embodiment, the aerator 100 is a venturi driven aspiration aerator that provides passive aeration to the growing tower 14 to which the NFG 12 is connected. This eliminates the need for a separate air pump. The venturi driven aspiration aerator 100 includes an elbow conduit 102, a venturi tube 104 and a mixing chamber 106. The venturi tube 104 has an inlet end 108 that is in fluidic communication with ambient air or another source of gas, and an outlet end 110 that is in fluidic communication with the mixing chamber 106. The mixing chamber 106 is also in fluidic communication with the conduit 44 at a location upstream of the swirler 22.

The elbow conduit 102 forms a portion of the flow path 36 (FIG. 2) between the reservoir 16 and the NFG 12, and is in fluidic communication with the conduit 44. The elbow conduit 102 can include a substantially horizontal conduit section 112 and a substantially vertical conduit section 114 that is aligned with the tower axis X, e.g., concentric to the tower axis X, and that joins the horizontal conduit section 112 at a bend 116. The horizontal conduit section 112 can define an aerator inlet 118. The venturi tube 104 can extend into the elbow conduit 102 at or near the bend 116, and is also aligned with the tower axis X, e.g., concentric to the tower axis X.

In one embodiment, a quick connector fitting 120 can couple the horizontal conduit section 112 of the elbow conduit 102 with the outlet end 48 of the conduit 44 and can establish a liquid-tight connection between the elbow conduit 102 and the conduit 44. An internally-threaded coupling 122 can couple the vertical conduit section 114 of the elbow conduit 102 with the inlet 86 of the casing 84 to establish a liquid-tight connection between aerator 100 and the NFG 12. Other structures for installing the aerator 100 within the flow path 36 are possible.

Optionally, the aerator 100 includes a jet tube 124 defining the mixing chamber 106. The jet tube 124 is internal to a portion of the elbow conduit 102, such as being within the vertical conduit section 114 and below the bend 116, and is also aligned with the tower axis X. The internal jet tube 124 can improve aspiration performance by providing sufficient pressure drop to pull air into the venturi tube 104 and/or by maintaining the velocity of the nutrient liquid/air emulsion through the aerator 100 so that it has enough velocity at the NFG 12 to form the nutrient film.

The outlet end 110 of the venturi tube 104 can be coincident with or extend into an upper end 126 of the jet tube 124 to define an annulus region 128 between the venturi tube 104 and the jet tube 124. A lower end 130 of the jet tube 124 can be located directly above the swirler 22. The annulus region 128 is the location of the greatest flow velocity and, correspondingly, the lowest pressure. Air is aspirated as the low pressure annulus region 128 pulls a vacuum on the venturi tube 104. In operation, under the pressure from the pump 18 (FIG. 2) at the aerator inlet 118, a high velocity stream of nutrient liquid exits the annulus region 128 into the mixing chamber 106. Air is aspirated into the mixing chamber 106 via the venturi tube 104. An emulsion of nutrient liquid and air is conveyed to the growing tower 14 by way of the swirler 22.

Other devices for providing aeration to the nutrient water are possible, such as air-stones or an air pump. Using the venturi driven aspiration 100 has the advantage of injecting oxygenated water directly into the vertical growing tower 14. Further, while ambient air is injected for the NFT system 10, it is understood that in other embodiments, an aerator can be used that injects other gases into the NFT system 10.

The swirler 22, in general, is a stationary part used to drive the nutrient liquid outwardly away from the axis X along the inside surface 94 of the casing 84. The swirler 22 can have a plurality of vanes 132 that induce a swirl on the nutrient liquid passing through the swirler 22 to turn a flow direction of nutrient liquid from being substantially axial (e.g., along axis X) to including a tangential component. The swirler 22 can mount to the casing 84 at the inlet 86 of the casing 84 and is non-rotating.

With reference to FIGS. 1-2 and 7, the NFG 12 can include a two-stage transition of the flow stream to generate the nutrient film flowing along the inside of the tower 14: (1) a first stage including the transition from the flow being substantially axial, for example as introduced to the NFG 12 at the inlet 86 thereof, to including a tangential component; and (2) a second stage including the transition of the flow to a nutrient film flowing downwardly along the inner surface 34 of the growing tower 14. The first stage includes the swirler 22 that accelerates nutrient liquid tangentially and directs the liquid both circumferentially and radially, encouraging the liquid to spread outwardly and evenly across the inner surface 94 of the casing 84. The second stage includes the rounded casing 84 (e.g., the concave corner 92) that transitions the swirling flow stream to a helical swirling flow stream that flows downwardly along the length of the tower 14. The swirler-directed flow will adhere the nutrient liquid to the inner surface 34 of the tower 14, and from there surface tension will keep the nutrient liquid on the inner surface 34 of the tower 14, creating a thin film of nutrient liquid. In this way, the nutrient film is created on the entire inside surface of the tower 14. For a cylindrical tower, the nutrient film is created on the inner circumference of the tower's sidewall 24. Thus, up to 100% of the growing 14 is potentially arable. Additionally, establishing the nutrient film at the upper end 30 of the tower 14 results in productive growth over the entire height of the tower 14.

The nutrient film, may have a film depth of about 3.0 to 6.5 mm (about ⅛ to ¼ inch), depending on the dimensions of the NFG 12 and tower 14. It is noted that the film depth may vary across the inner surface 34 of the tower 14, including having a first average film depth at the upper end 30 of the tower 14 and a second average film depth at the lower end 40 of the tower 14.

Figures 8, 9, 10:
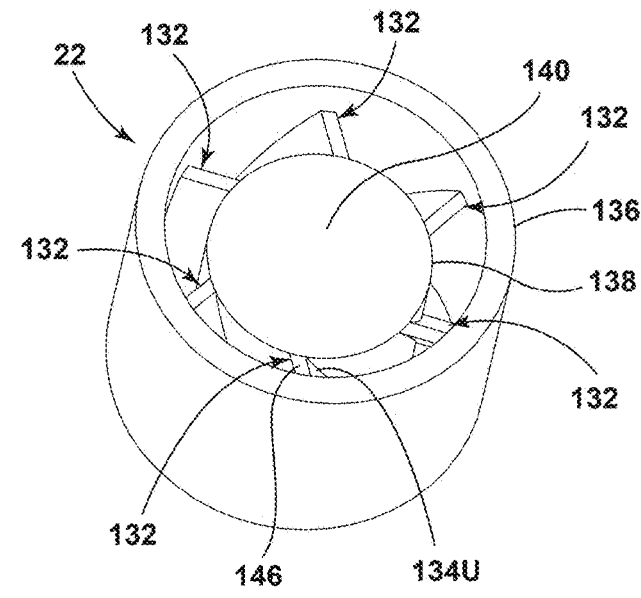
FIG. 8 is a perspective view of a swirler for the nutrient film generator according to an aspect of the disclosure.
FIG. 9 is a top view of the swirler from FIG. 8.
FIG. 10 is a sectional view through the swirler from FIG. 8.

FIGS. 8-10 are various view of the swirler 22 according to one aspect of the disclosure. In one embodiment, the vanes 132 are a plurality of circumferentially spaced static vanes that extend radially relative to the tower axis X. The vanes 132 can be plate-like, e.g., flat and linear, or non-linear, e.g., arcuate or curved. In yet another example, the vanes 132 can be airfoil-shaped.

The vanes 132 of the swirler 22 can have an upper vane surface 134U that faces the incoming flow of nutrient liquid and a lower vane surface 134L opposite the upper vane surface 134U. One or both of the vane surfaces 134U, 134L are shaped to induce the flow to change direction from axial and impart a tangential component to the flow. For example, the vane surfaces 134U, 134L may be angled, arcuate, curved, or a combination thereof to impart a tangential, rotational, swirling, or spiral velocity vector to the nutrient liquid flowing through the NFG 12, and turn a flow direction of the nutrient liquid from being substantially axial, e.g., along axis X, to including a tangential component.

The swirler 22 may comprise a jacket 136 at least partially surrounding the vanes 132. The profile or shape of the jacket 136 may match the profile or shape of the inlet 86 or other location in which the swirler 22 is placed. For example, the jacket 136 may be cylindrical. The jacket 136 may be smooth to facilitate insertion into and/or removal from the inlet 86. In other configurations of the swirler 22, the jacket 136 may not be present. For example, the vanes 132 may fit within the inlet 86.

The vanes 132 may extend from the jacket 136 towards a center of the swirler 22. The vanes 132 may extend only partially along the axial length of the jacket 136 and may begin and/or end at locations other than the axial ends 142, 144 of the jacket 136. In another configuration, the vanes 132 may extend along the entire axial length of the jacket 136.

The vanes 132 may support an internal hub 138 that may be centrally located in the swirler 22 and that may extend axially along a length L of the swirler 22. The hub 138 is closed to fluid flow, which reduces the cross-sectional area of the flow path and accelerates the flow. In some embodiments, the hub 138 can have a domed end 140 facing the incoming flow to reduce turbulence. In some configurations, the hub 138 may not be present, and ends of the vanes 132 may touch at or near the center of the swirler 22.

In one embodiment, the vanes 132 may extend axially and spirally along at least a portion of the axial length L of the swirler 22. In some embodiments, the axial length L of the swirler 22 may be the axial length of the jacket 136. As liquid flows along the vanes 132, and particularly along the vane surfaces 134U, 134L, the liquid may be guided in such a way that a part of the axial component of the flow velocity vector may be modified to increase the tangential component of the flow velocity vector. The vanes 132 may be spaced evenly about the tower axis X, e.g., the vanes 132 may be positioned such that they extend inwardly from the jacket 136 at positions that are radially equidistant with respect to the inner surface of the jacket 136 and/or such that they extend outwardly from the hub 138 at positions that are radially equidistant with respect to the outer surface of the hub 138. In other embodiments, the vanes 132 may be staggered about the tower axis X.

Each vane 132 may have a leading end 146 and a trailing end 148, with the vane surface extending from the leading end 146 to the trailing end 148. The trailing end 148 is offset vertically from the leading end 146. The vanes 132 define a plurality of flow passages 150 between each adjacent vane, e.g., between the upper vane surface 134U of one vane 132 and the lower vane surface 134L of an adjacent vane 132.

The vanes 132 may each be angled such that they spirally traverse at least a portion or, in some embodiments, all of the length L of the swirler 22 without intercepting each other (that is, the vanes 132 do not intersect in some embodiments). The angles of the vanes 132 may be such that the starting position of a given one of the vanes 132, as defined by the leading end 146, is circumferentially offset by less than 360 degrees from the ending position of the vane 132, as defined by the trailing end 148. In other embodiments, at least one vane 132 may extend at least 360 degrees around the tower axis X.

At least one of the vanes 132 may have a constant pitch along one or both of its vane surfaces 134U, 134L. In other words, the vane 132 may extend spirally along the length L of the swirler 22 such that the angle between any two points along the one or both of its vane surfaces 134U, 134L is constant.

Other configurations for the swirler 22 are contemplated. For example, although FIGS. 8-10 illustrate that the pitch of the vanes 132 may be constant, in another embodiment the pitch of the vanes 132 may be variable across any portion of the length L of the swirler 22. Additionally, although FIGS. 8-10 illustrate that the swirler 22 may comprise six vanes 132, in some configurations, a single vane may be used, less than six vanes may be used, or more than six vanes may be used.

While a non-rotating swirler 22 with static vanes 132 are shown, in another embodiment, the NFG 12 includes at least one rotating element that imparts a tangential component on the liquid flow passing through the NFG 12. For example, the NFG 12 can include a rotating swirler and/or one or more rotating vanes.

Referring to FIG. 1-2, in one aspect of the disclosure, the NFT system 10 can include a user interface 152 interconnecting a power source and the pump 18. As disclosed above, the pump 18 may be connected to a power source by the power supply cord 42. The user interface 152 regulates operation of the pump 18, and in some embodiments may additionally be used to control other operating parameters of the NFT system 10. The user interface 152 can electronically or mechanically communicate with the pump 18 to monitor and/or control operation of the pump 18, and may in some embodiments may additionally monitor and/or control other operating parameters of the NFT system 10. The user interface 152 can be a physical interface local to the pump 18. Alternatively, the pump 18 can wirelessly communicate with a remote user interface, such as a smartphone or tablet.

A duty cycle timer 154 can be interposed between the power source and the pump 18 to control a duty cycle of the pump 18, and thereby control the flow of nutrient liquid to the growing tower 14. For example, duty cycle has a pump-off time and a pump-on time, and the user interface 152 can have an input control, e.g., a dial, touch screen, or the like, that varies at least one of the pump-off time and the pump-on time. The duty cycle timer 154 can be operated to initiate each interval (e.g., pump on or pump off) within the duty cycle. Such intervals can include starting the pump 18 to supply a flow of nutrient liquid to the growing tower 14, stopping the pump 18 to interrupt the flow of nutrient liquid to the growing tower, 14 starting the pump 18 to resume the flow of nutrient liquid to the growing tower 14, and so on. Using the duty cycle timer 154, the supply of nutrient liquid can be modulated to properly moisten the grow media 66.

The NFT system 10 be operated under one of a plurality of different duty cycles, depending on the stage of plant growth, type of plant, ambient conditions, and other parameters affecting optimal growth. For example, the system 10 can be operated under a germination duty cycle or a growth duty cycle. For a germination duty cycle, the pump 18 may operate with a 1:60 ratio for pump-on time and pump-off time, such the pump 18 being on for 1 minute and off for 1 hour. For a growth duty cycle, the pump 18 may operate with a 1:1 ratio for pump-on time and pump-off time, such the pump 18 being on for 1 minute and off for 1 minute. Other timing ratios for the germination duty cycle and the growth duty cycle, with the pump 18 typically being off much longer during the germination duty cycle than for the growth duty cycle. Using the user interface, 152 a user can select the germination duty cycle, a growth duty cycle, or another duty cycle for optimal growth.

With the use of the duty cycle timer 154, the pump on/off ratio can be adjusted to keep from over-soaking the grow media 66. This allows seeds to be directly added to the grow media 66 for germination without the need to have intermediate sprouting equipment, saving both time and effort. When the duty cycle timer 154 is set for a germination duty cycle, the nutrient film intermittently moistens the grow media 66, promoting seed germination without mold or rot.

FIG. 3 shows an NFT system 10 having multiple growing towers 14. A series of inlet flow conduits 156 are suspended from a header manifold 20 which is supplied with nutrient liquid by pump 18. The inlet flow conduits 156 each run to respective NFGs 12 that create the nutrient film inside the towers 14. A reservoir 16 is disposed at the bottom of each tower 14 to collect surplus or runoff nutrient liquid running down from their respective tower 14. An outlet flow conduit 158 in fluidic communication with the reservoirs 16 passes nutrient liquid back to the pump 18. The reservoirs 16 can be connected in series, such that nutrient liquid is fed from one reservoir 16 through another on its path through the conduit 158 back to the pump 18. Alternatively, the reservoirs 16 can be arranged in parallel, such as in a spoke pattern, and can each be directly connected to the pump 18 by individual outlet flow conduits 158.

In one configuration, each tower reservoir 16 is fluidly coupled with a common system reservoir (not shown) in which the pump 18 is located. At least a portion of the outlet flow conduit 158 can be arranged at an incline and connected to the system reservoir such that the surplus nutrient collected in each tower reservoir 16 flows by gravity back to the system reservoir. Alternatively, the surplus nutrient collected in each tower reservoir 16 can be pumped back to the system reservoir.

In yet another configuration, instead of having multiple reservoirs 16, the bottom of each growing tower 14 can be open to otherwise fluidly coupled to a collection trough (not shown) which collects surplus nutrient running down from the towers 14, and passes it back to a system reservoir (not shown) in which the pump 18 is located. The trough can be inclined and connected to the system reservoir such that the surplus nutrient collected in the trough flows by gravity back to the system reservoir. Alternatively, the surplus nutrient collected in the trough can be pumped back to the system reservoir.

The nutrient film generator (NFG) and nutrient film technique hydroponic system (NFT system) provide unique features to improve the performance of hydroponic nutrient circulation systems. The NFG and NFT system use centrifugal force to form the nutrient film. The growing tower 14 may be arable about the entire perimeter and height of the tower, maximizing surface utilization. Germination may be done on the tower 14, allowing plants to reach their full growth on the tower 14. The devices may aerate the nutrient liquid without the need for air pumps, air stones, and air tube plumbing. The devices may work with continuous or timed pump operation.

While discussed herein in the context of hydroponics, aspects of the system and/or film generator disclosed herein can be applied in other devices where a thin film of fluid is generated and flows through a device.

The above descriptions are those of current embodiments of the invention. Various alterations and changes can be made without departing from the spirit and broader aspects of the invention as defined in the appended claims, which are to be interpreted in accordance with the principles of patent law including the doctrine of equivalents.

This disclosure is illustrative and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as alternatives.

Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A nutrient film technique hydroponic system for cultivating plants comprising:

a growing tower having a cylindrical sidewall at least partially defining a hollow interior, an inlet into the hollow interior at an upper end of the growing tower, and a plurality of planting ports in the cylindrical sidewall, wherein the plurality of planting ports are below the inlet and open to the hollow interior;

a tower axis extending axially through the hollow interior;

a pump configured to supply nutrient liquid to the inlet of the growing tower; and a nutrient film generator at the upper end of the growing tower configured to convert a flow of nutrient liquid into a nutrient film flowing axially and radially, relative to the tower axis, along an inner surface of the cylindrical sidewall of the growing tower, the nutrient film generator comprising:

a nutrient liquid inlet through which nutrient liquid is introduced to the nutrient film generator in a substantially axial direction along the tower axis, wherein the tower axis passes through the nutrient liquid inlet; and a swirler aligned with the tower axis and comprising a plurality of circumferentially spaced static vanes, the swirler configured to induce a swirl on the nutrient liquid passing through the swirler to turn a flow direction of the nutrient liquid from being substantially axial along the tower axis to including a tangential component that directs the nutrient liquid both circumferentially and radially with respect to the tower axis.

2. The nutrient film technique hydroponic system of claim 1, comprising a reservoir configured to hold a supply of nutrient liquid, wherein the reservoir is fluidly coupled to the nutrient film generator by a flow path including the pump.

3. The nutrient film technique hydroponic system of claim 2, wherein the growing tower comprises an outlet from the hollow interior at a lower end of the growing tower, wherein the outlet drains into the reservoir, wherein the pump is a recirculation pump mounted within the reservoir to recirculate nutrient liquid from the outlet back to the inlet of the growing tower.

4. The nutrient film technique hydroponic system of claim 3, wherein the flow path includes a conduit having an inlet end fluidly coupled to an outlet of the pump and an outlet end in fluidic communication with the inlet of the growing tower via the nutrient film generator, wherein the conduit comprises at least one conduit section extending generally parallel to the tower axis.

5. The nutrient film technique hydroponic system of claim 3, comprising an aerator fluidly upstream of the swirler, wherein the aerator is configured to inject air into the flow of nutrient liquid before the flow of nutrient liquid reaches the swirler.

6. The nutrient film technique hydroponic system of claim 2, wherein the reservoir comprises an open-topped container and a lid for the open-topped container, wherein the lid comprises a tower base engaging with a bottom end of the growing tower and configured to support the growing tower in a generally vertical orientation.

7. The nutrient film technique hydroponic system of claim 1, wherein:

the plurality of planting ports are spaced about a circumference of the cylindrical sidewall and include at least a first planting port on a first side of the cylindrical sidewall, a second planting port on a diametrically-opposed second side of the cylindrical sidewall, and a third planting port vertically spaced above the first and the second planting ports.

8. The nutrient film technique hydroponic system of claim 1, comprising at least one grow pot, the at least one grow pot removably mounted in one of the plurality of planting ports, the at least one grow pot capable of receiving plant grow media.

9. The nutrient film technique hydroponic system of claim 1, comprising:

a user interface interconnecting a power source and the pump, the user interface configured to regulate an operation of the pump; and a duty cycle timer interposed between the power source and the pump, wherein the duty cycle timer controls a duty cycle of the pump and thereby controls the flow of nutrient liquid to the growing tower;

wherein the duty cycle has a pump-off time and a pump-on time, and the user interface comprises an input control that varies at least one of the pump-off time and the pump-on time.

10. The nutrient film technique hydroponic system of claim 1, wherein:

the nutrient film generator comprises a casing having the nutrient liquid inlet, and the swirler is at the nutrient liquid inlet; and the casing comprises a substantially horizontal upper wall curving to meet a substantially vertical sidewall to transition the flow direction of the nutrient liquid from including the tangential component to a helical swirling flow stream that flows along the inner surface of the cylindrical sidewall of the growing tower.

11. The nutrient film technique hydroponic system of claim 10, wherein the casing comprises:

a first diameter at the nutrient liquid inlet, the first diameter taken along a plane perpendicular to the tower axis and passing through the nutrient liquid inlet; and a second diameter at the substantially vertical sidewall, the second diameter taken along a plane perpendicular to the tower axis and passing through the substantially vertical sidewall;

wherein the second diameter is greater than the first diameter.

12. The nutrient film technique hydroponic system of claim 11, wherein the growing tower has a third diameter at the cylindrical sidewall taken along a plane perpendicular to the tower axis and passing through the cylindrical sidewall, where the third diameter is greater than the first diameter.

13. The nutrient film technique hydroponic system of claim 1, comprising an aerator fluidly upstream of the swirler, wherein the aerator is configured to inject air into the flow of nutrient liquid before the flow of nutrient liquid reaches the swirler, wherein the aerator is a venturi driven aspiration aerator that is in series with and directly upstream of the swirler.

14. The nutrient film technique hydroponic system of claim 1, comprising a plurality of other growing towers, wherein the pump supplies nutrient liquid to each of the plurality of other growing towers.

15. A method for cultivating plants in a hydroponic system, the method comprising:

providing a growing tower having a cylindrical sidewall at least partially defining a hollow interior, a tower axis extending axially through the hollow interior, an inlet into the hollow interior at an upper end of the growing tower, an outlet from the hollow interior at a lower end of the growing tower, and a plurality of planting ports in the cylindrical sidewall, wherein the plurality of planting ports are below the inlet and open to the hollow interior;

supplying nutrient liquid from a reservoir to the inlet of the growing tower;

generating a nutrient film within the growing tower by accelerating the nutrient liquid tangentially and inducing the nutrient liquid to flow axially and radially, relative to the tower axis, along an inner surface of the cylindrical sidewall as a nutrient film; and collecting runoff nutrient liquid that exits from the outlet of the growing tower within the reservoir.

16. The method of claim 15, wherein:

supplying nutrient liquid from a reservoir comprises pumping nutrient liquid from the reservoir to a swirler at the inlet of the growing tower, the swirler comprising a plurality of vanes; and generating the nutrient film comprises accelerating the nutrient liquid tangentially with the swirler.

17. The method of claim 16, comprising injecting air into the nutrient liquid with an aerator before the nutrient liquid reaches the swirler.

18. A nutrient film technique hydroponic system for cultivating plants comprising:

a growing tower having a tower sidewall at least partially defining a hollow interior, an inlet into the hollow interior at an upper end of the growing tower, and a plurality of planting ports in the tower sidewall, wherein the plurality of planting ports are below the inlet and open to the hollow interior;

a tower axis extending axially through the hollow interior;

a pump configured to supply nutrient liquid to the inlet of the growing tower; and a nutrient film generator at the upper end of the growing tower that converts a flow of nutrient liquid into a nutrient film flowing along an inner surface of the tower sidewall of the growing tower, the nutrient film generator comprising:

a casing having a nutrient liquid inlet, an upper wall extending radially from the nutrient liquid inlet, and a casing sidewall extending downwardly from the upper wall, wherein the tower axis passes through the nutrient liquid inlet; and a swirler configured to induce a swirl on the nutrient liquid passing through the swirler to turn a flow direction of the nutrient liquid from being substantially axial along the tower axis to including a tangential component;

wherein the casing has a concave inner surface where the upper wall meets the casing sidewall to transition the flow direction of the nutrient liquid from including the tangential component to a helical swirling flow stream that flows along the inner surface of the tower sidewall.

19. The nutrient film technique hydroponic system of claim 18, wherein the casing comprises:

a first diameter at the nutrient liquid inlet, the first diameter taken along a plane perpendicular to the tower axis and passing through the nutrient liquid inlet;

a second diameter at the casing sidewall, the second diameter taken along a plane perpendicular to the tower axis and passing through the casing sidewall, wherein the second diameter is greater than the first diameter; and a third diameter at the tower sidewall taken along a plane perpendicular to the tower axis and passing through the tower sidewall, wherein the third diameter is greater than the first diameter.

* * * * *